UNITED STATES PATENT OFFICE.

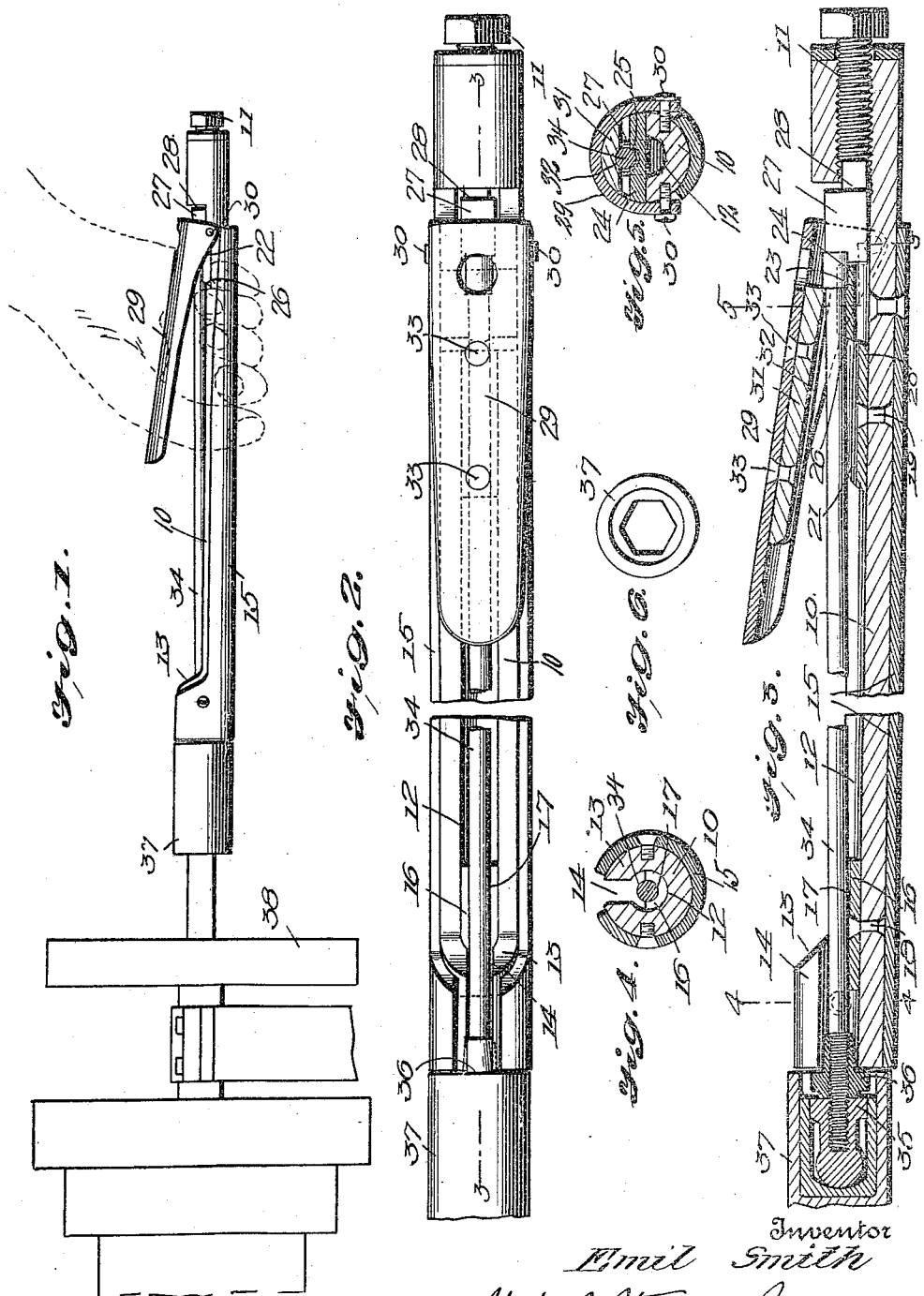

EMIL SMITH, OF FLINT, MICHIGAN.

ROD-HOLDING TOOL.

1,230,814.  Specification of Letters Patent.  Patented June 19, 1917.

Application filed February 23, 1917. Serial No. 150,505.

*To all whom it may concern:*

Be it known that I, EMIL SMITH, a citizen of the United States, residing at Flint, in the county of Genesee and State of Michigan, have invented new and useful Improvements in Rod-Holding Tools, of which the following is a specification.

This invention relates to devices for holding rods to facilitate the application of nuts thereto, the device being especially designed for use in connection with the valve push rods of automobile and other internal-combustion engines, and it being so constructed that the rod may be easily and securely held to allow a nut to be run on one end thereof by a power-driven rotatable chuck or similar member.

The invention has for its object to provide a simple and efficient holding device of the kind stated, and to this end it consists in a novel combination and arrangement of parts to be hereinafter described and claimed, reference being had to the accompanying drawing forming a part of this specification.

In the drawing,

Figure 1 is a side elevation of the tool, showing the manner in which it is used;

Fig. 2 is an enlarged plan view of the tool;

Fig. 3 is a central longitudinal section on the line 3—3 of Fig. 2;

Figs. 4 and 5 are cross-sections on the lines 4—4 and 5—5, respectively, of Fig. 3, and Fig. 6 is an end view of a chuck employed in connection with the rod holder.

Referring specifically to the drawing, 10 denotes a shank having at one end a threaded axial opening to receive a screw 11 for a purpose to be presently described, this being the butt end of the shank. The remainder of the shank has a longitudinal groove 12 extending to the outer end thereof, at which latter end the shank is enlarged into nearly circular cross section, as shown at 13, with a slot 14 opening therethrough into the groove 12. The shank is also fitted with a wear sleeve 15 fastened thereto in any suitable manner. This sleeve does not completely encircle the shank so that its groove 12 and the slot 14 are left open and unobstructed, and the sleeve also stops short of the butt end of the shank.

In the forward end of the groove 12 seats a block 16 having a top groove 17, said block extending for a short distance into the enlarged portion 13 of the shank, and being riveted or otherwise fixed to the shank as shown at 18.

Adjacent to the butt end of the shank 10, there is riveted or otherwise fastened thereto, as shown at 19, a block 20, said block seating in the groove 12 and having a top groove 21.

Back of the block 20, the shank has a transverse top groove 22 intersecting the groove 12. In the groove 22 seats a block 24 having a top groove 25. The forward end of the groove 22 is undercut, and the corresponding end of the block 24 is correspondingly shaped as shown at 26.

Back of the block 24, the shank 10 carries a slidable abutment block 27 having a reduced rear portion 28 extending into the threaded butt end of the shank in which the screw 11 is mounted, and engageable by the latter for longitudinal adjustment relative to the shank.

Above the block 24 is located a gripping lever 29 which is curved so that it may straddle the shank 10, to opposite sides of which latter it is pivotally connected at one end, as shown at 30. The under side of the lever 29, or that side which faces the shank carries a filler piece 31 having a longitudinal groove 32. This filler piece is riveted or otherwise secured to the lever, as shown at 33.

As hereinbefore stated, the tool is designed for holding a valve push rod for facilitating the application of a nut to one end thereof. This rod is shown at 34, and the nut at 35, the same having a spherical end as usual. The valve rod also receives a lock nut 36 located behind the nut 35. The tool is used as follows:

The rod 34 is placed in the groove 12 of the shank 10 with one end resting in the groove 17 of the block 16, and the other end resting in the groove 25 of the block 24. The tool is grasped with one hand, as shown dotted in Fig. 1, in such a manner that the lever 29 is swung down and its filler piece 31 grips that end of the rod which seats on the block 24, thereby clamping the rod down on the block and holding it so that it cannot turn or slip lengthwise. The threaded end of the rod to receive the nuts projects from the forward end of the shank. The lock nut 36 is first placed on the rod by hand and run thereon just far enough to hold. The nut is then inserted into the socket of a chuck 37 carried by some rotatable, power-driven device 38, the shank being held to carry the nut to the chuck and to hold the rod steady while the nut is being screwed on by the rotation of the chuck. After the nut 36 is in place on the rod, it is withdrawn from the chuck, and the nut 35 is then applied in the same way as the nut 36.

The rear end of the rod 34 abuts against the block 27, which, as already described, is longitudinally adjustable to adapt the device to rods of different lengths. The function of the sleeve 15 is to keep the end of the tool from wearing and also give the operator a better hold. The rod 34 slides on the block 20 when it is positioned in or removed from the tool. The block 24 is a piece of tempered tool steel to reduce the wear to a minimum, and it is separable from the tool so that it may be removed or replaced.

I claim:—

1. A rod holding tool of the character described, comprising a shank having rod seats, a clamping lever pivoted to the shank and having means engageable with the rod for clamping it down on one of the seats, and an abutment on the shank at the butt end thereof engageable by the inner end of the rod, said abutment being longitudinally adjustable.

2. A rod holding tool of the character described, comprising a shank having rod seats, a clamping lever pivoted to the shank and having means engageable with the rod for clamping it down on one of the seats, an abutment on the shank at the butt end thereof engageable by the inner end of the rod, said abutment being slidable longitudinally on the shank, and an axial screw carried by the butt end of the shank and engageable with the abutment.

In testimony whereof I affix my signature.

EMIL SMITH.

Copies of this patent may be obtained for five cents each, by addressing the "Commissioner of Patents, Washington, D. C."